Patented Jan. 5, 1954

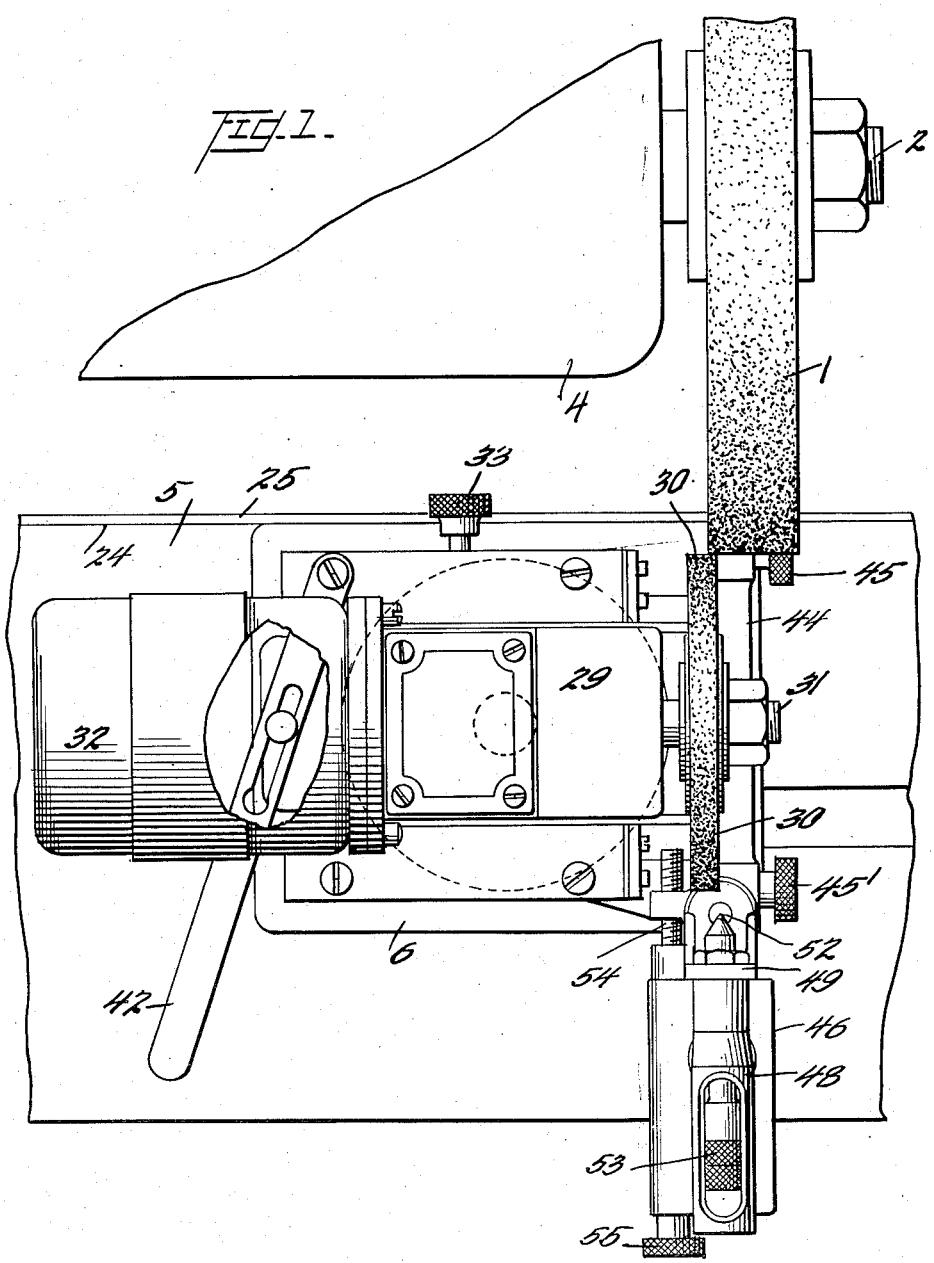

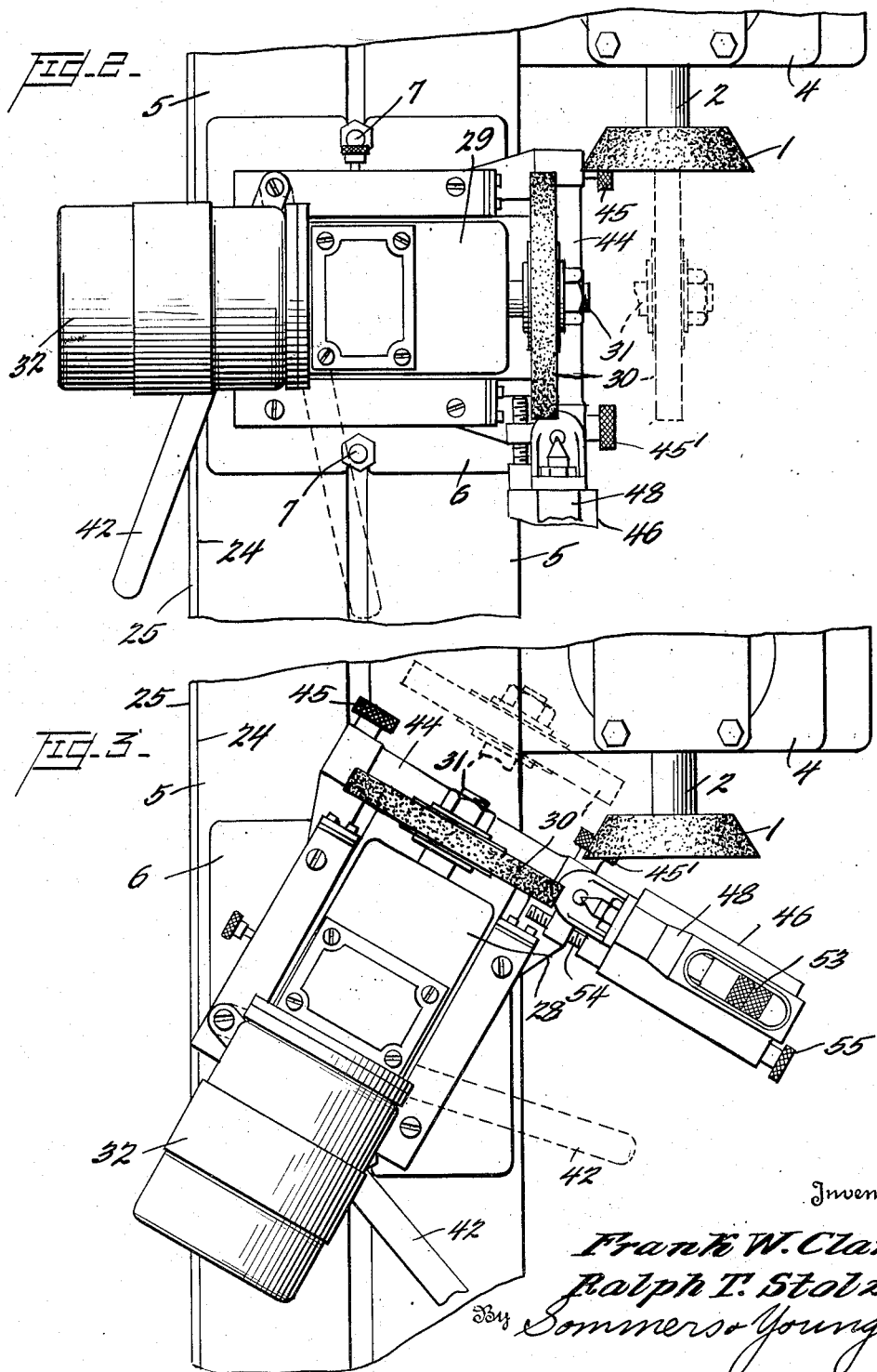

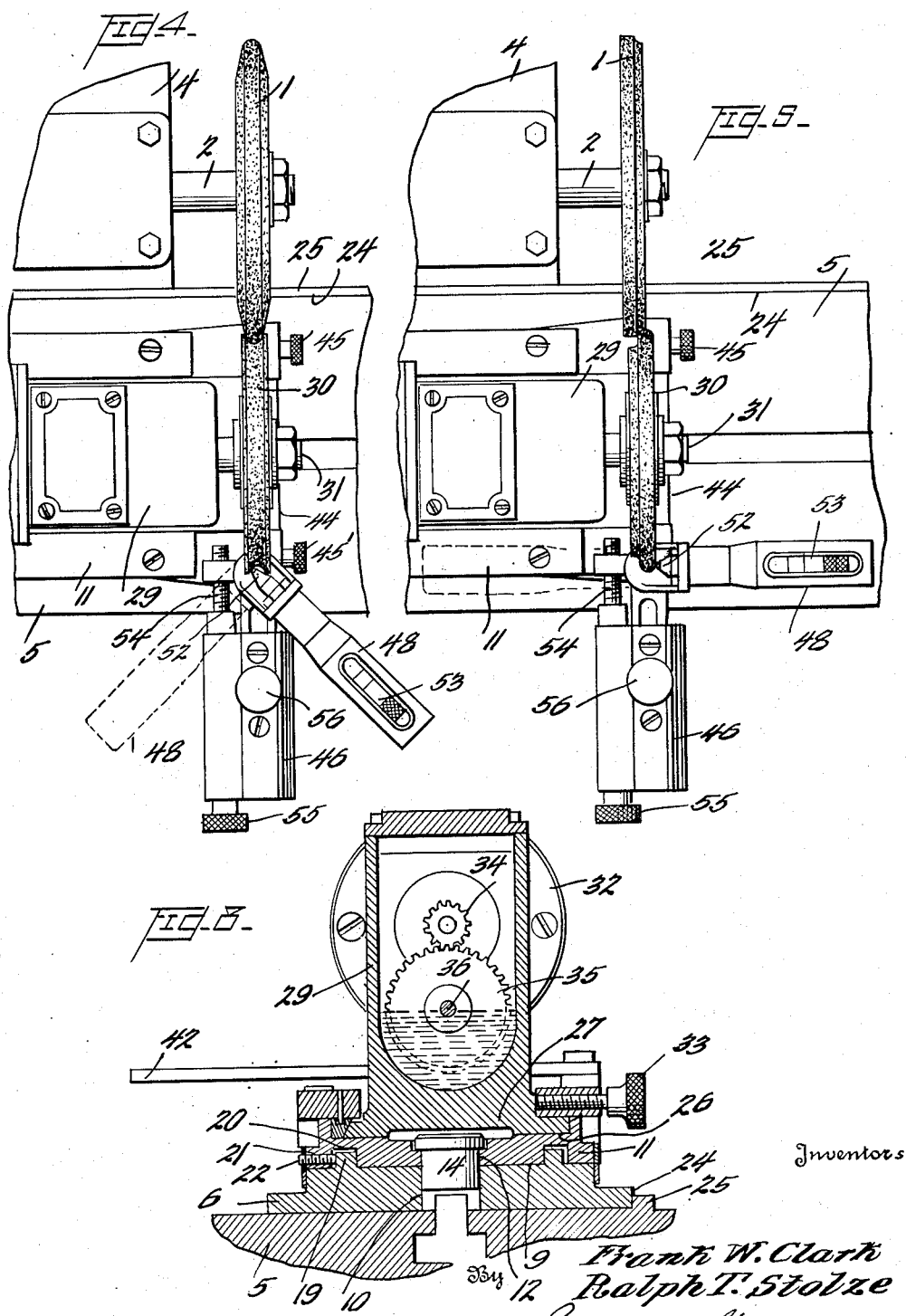

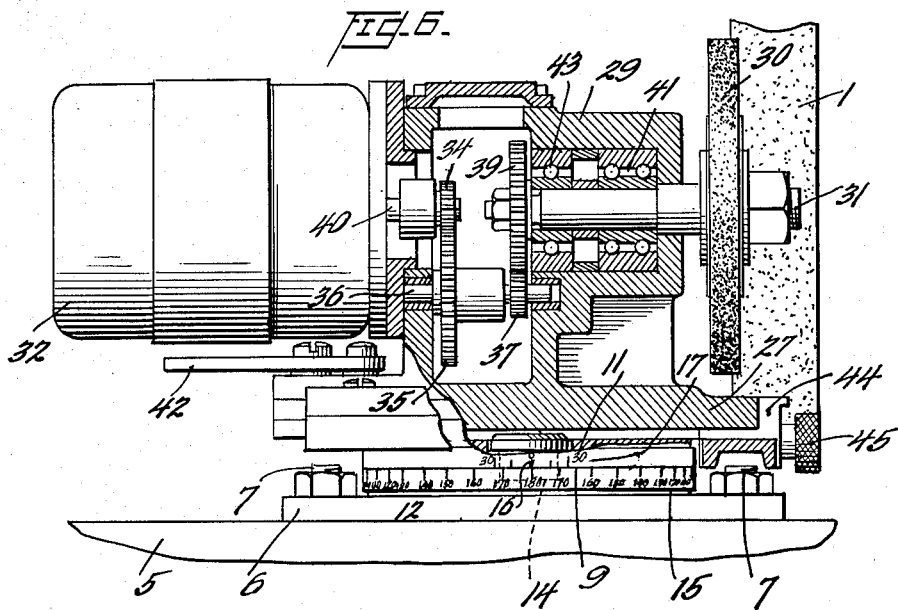
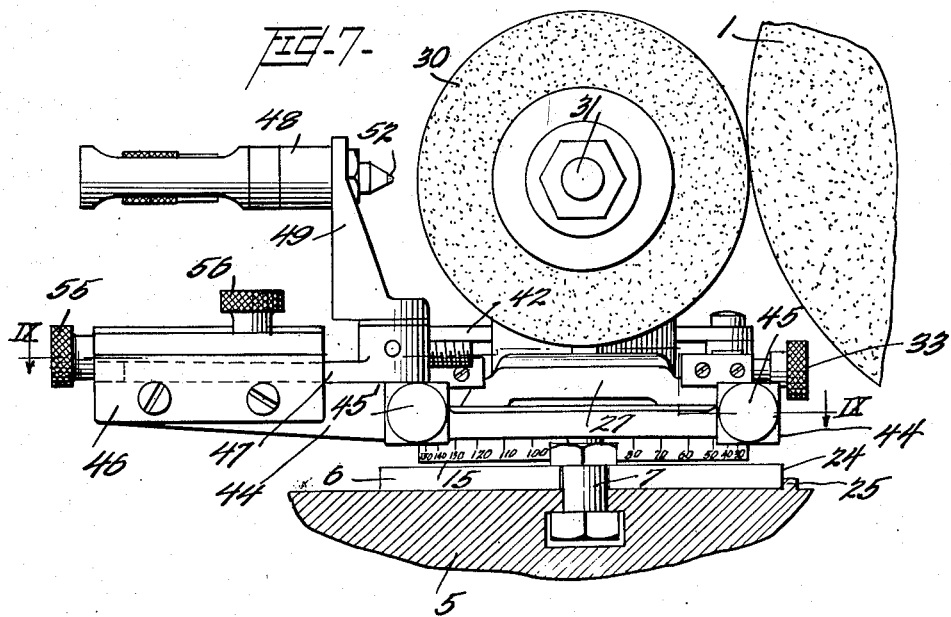

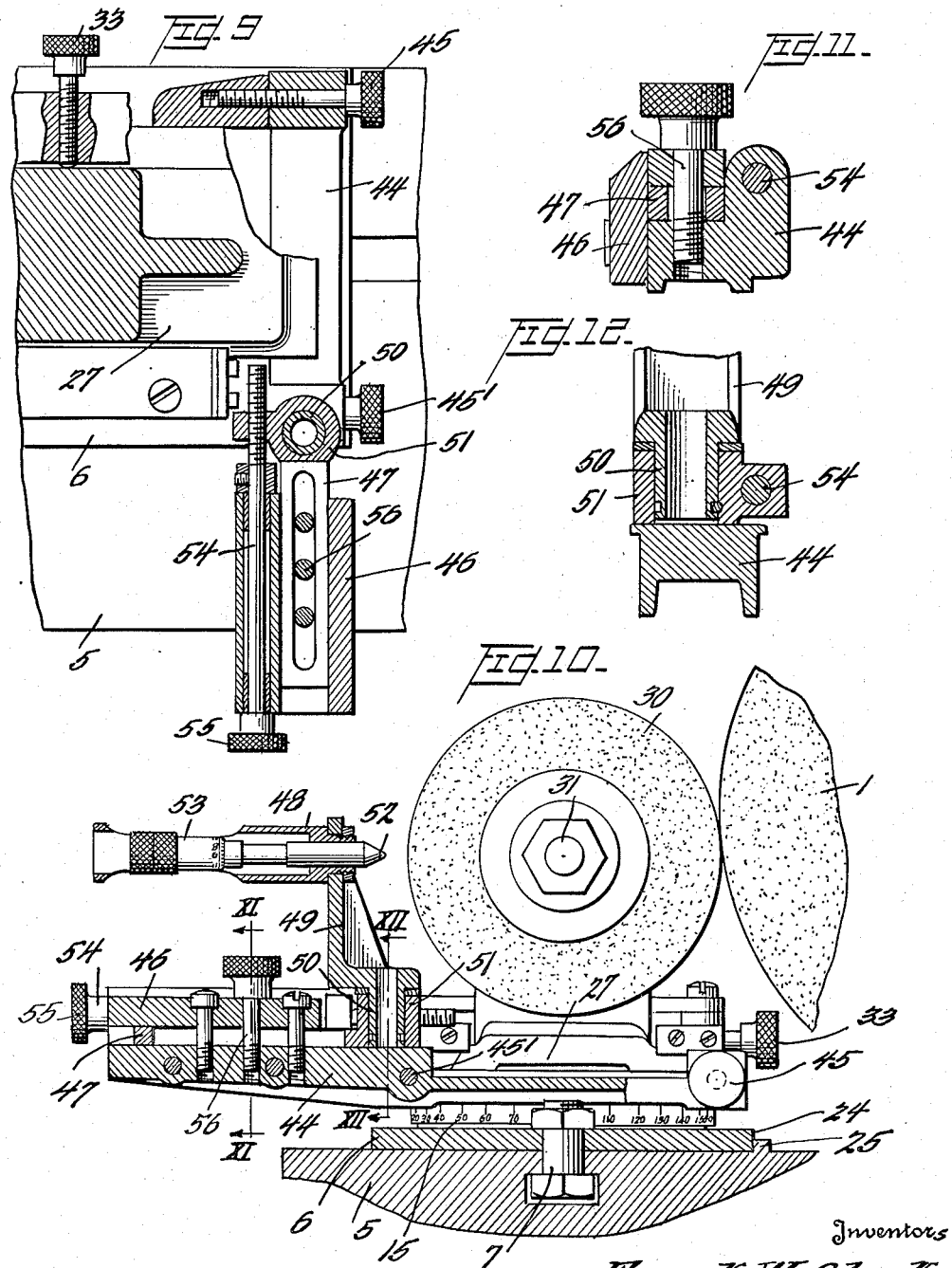

2,664,681

UNITED STATES PATENT OFFICE 2,664,681

METHOD OF DRESSING DIAMOND WHEELS

Frank W. Clark, Rockfall, Conn., and Ralph T. Stolze, Fort Lauderdale, Fla.; said Clark assignor to Robert J. Hood, doing business as Eastern Tool Company, East Hartford, Conn.

Application July 19, 1948, Serial No. 39,406

3 Claims. (Cl. 51—283)

This invention or discovery relates to methods and apparatus for dressing diamond lapping and grinding wheels and has for an object the provision of a method and apparatus by which a diamond wheel can be dressed or profiled with a minimum expenditure of time and labor by the operator and with a minimum of loss of material from the diamond wheel.

Heretofore when a diamond wheel became worn, dull or out of shape, or if for any other reason it was desired to redress it, for instance to provide a new angle or new profie, it has always been necessary to remove it from the machine in which it operates and place it in another machine adapted to dress the wheel. After being dressed it was then necessary to transfer it back to the machine in which it was to operate. It was found that due to slight inaccuracies or nonconformities, of the spindles of the machine a diamond wheel which had been redressed and returned to the machine in which it was to operate was practically never exactly true to shape or position and required a considerable period of running with consequent waste of time and material of the diamond wheel before it was ready to be put back in operation for useful purposes.

An object of this invention is to provide an apparatus and a method by which a diamond wheel can be dressed or profiled without removing it from the machine in which it operates, thus avoiding the work and loss of time involved in transferring it to and from the dressing machine, and the running time required before the wheel is again properly centered ready for useful operation.

A further object of the invention is to provide an apparatus and method by which a diamond wheel can be dressed in the machine in which it operates by means of an apparatus adapted to be mounted on and secured to the frame of a diamond wheel grinding machine.

Another object of the invention or discovery is to provide for the dressing of a diamond wheel while operating at approximately its normal speed of operation by means of an ordinary grinding wheel operating at a considerably lower surface speed whereby the unit stress in the minutely small local areas of support of the fine diamond particles are exceeded and locally fractured and the diamond wheel surface is brought to the shape of the grinding or transfer wheel engaging it. At the same time the ordinary grind wheel may be continually kept in its true shape by a further dressing device for instance a diamond point mounted to move axially of the grinding wheel or at an angle, or through an arc to provide a curved shape.

Further objects of the invention or discovery will become apparent from the following detailed description thereof which has reference to the accompanying drawings in which Fig. 1 is a plan view of part of a diamond wheel grinding or lapping machine having a wheel dressing and transfer mechanism mounted on its frame or work table in position to dress or true the outer surface of the diamond wheel as a cylindrical surface.

Fig. 2 is a plan view of part of a diamond wheel lapping machine having a dressing and contour transfer apparatus mounted on its frame or work table, the transfer wheel being illustrated in dotted lines at the other end of its travel as the dressing machine is reciprocated across the working surface of the diamond wheel for truing a front face type of diamond wheel.

Fig. 3 is a plan view similar to Fig. 2 with the transfer wheel in position to shape or true an oblique or tapering face of a conical diamond wheel, the transfer wheel being shown in dotted lines at the other end of its travel as the dressing machine is reciprocated across the working surface of the diamond wheel for truing a conical face type of diamond wheel.

Fig. 4 is a plan view of part of a diamond wheel grinding machine with transfer wheel and transfer dressing device with the transfer wheel dressed with a concave groove for applying a convex outer surface to the diamond wheel.

Fig. 5 is a view similar to Fig. 4 with the transfer wheel dressed with a convex surface for applying concave groove in an edge of the diamond wheel;

Fig. 6 is a vertical sectional view of the transfer wheel drive and adjusting mechanism;

Fig. 7 is a vertical end view of the transfer wheel and dressing device mounted on the frame of a diamond wheel grinding machine with part of the frame of the grinding machine in section;

Fig. 8 is a vertical sectional view of the angular adjusting mechanism of the transfer wheel;

Fig. 9 is a horizontal sectional view on the line IX—IX of Fig. 7 (not shown in Fig. 7), illustrating details of the adjusting mechanism of the dressing device;

Fig. 10 is a vertical sectional view showing details of the transfer wheel dressing device adjusting mechanism;

Fig. 11 is a sectional view on the line XI—XI of Fig. 10 showing details of mechanism for clamping the transfer wheel dressing device in radially adjusted position;

Fig. 12 is a sectional view on the line XII—XII of Fig. 10 showing details of means for pivotally adjusting the dressing device:

In the accompanying drawings reference numeral 1 refers to a diamond grinding or lapping wheel, that is to say, a wheel which contains or is impregnated with diamond particles is in working portion, mounted on a shaft 2 which in operation is driven by an electric motor 4 or the like. The work table of the grinding machine is indicated by numeral 5 and on this table is mounted the base plate 6 of the transfer wheel machine. The base plate 6 of the transfer machine may be secured on the work table by suitable means such as by bolts 7 or by a magnetic chuck or the like. The upper part of the base plate is provided with a smooth flat surface 9 and a central cylindrical recess 10 serving for definitely referencing an intermediate base 11 with respect thereto. The intermediate base 11 is also provided with a central bore 12. A pin 14 passes through recess 12 which it fits with precision and its lower portion is pressed into recess 10 of the base plate. The upper end portion of the pin 14 is slightly enlarged and holds the upper base against vertical displacement. The pin 14 serves as a spindle for providing rotary adjustment of the intermediate base with respect to base plate 6. The exterior of the upper portion of the base 6 is circular as is also the exterior of the intermediate base 11 and one of these circular parts (illustrated as the upper part of the base plate) is provided with graduations 15 of 360° and the other of said parts may be provided with a reference point 16 and possibly a vernier 17. For the purpose of locking the intermediate base 11 with respect to the base 6, the base is provided with an annular flange 19 raised from its upper surface and concentric about the axis of pivot 14. The lower face of the intermediate base 11 is provided with a recess 20 corresponding to the flange 19 and accommodating said flange. The outer portion of the intermediate base is provided with a threaded bore 21 in which is screwed a set screw 22 for engaging against flange 19 to lock the intermediate base against rotation with respect to the base 6.

For the purpose of providing for quick alinement of the axis of the transfer wheel mechanism with the axis of the diamond wheel, when the reference point 16 is set on zero degrees, one edge 24 of the base plate is made exactly parallel with the normal axis of the transfer wheel and this edge is placed in engagement with an upstanding shoulder 25 normally provided on the work table of the diamond wheel grinder, said shoulder being parallel with the axis of the diamond wheel.

The upper portion of the intermediate base contains a guide 26 for a slide 27, which constitutes the bottom part of a housing 29, which contains drive gearing for the transfer wheel 30. The gearing is driven by the shaft 40 of an electric motor 32 secured on one end of the gear housing 29. The drive gearing may comprise a drive pinion 34 on the motor shaft, a pinion 35 mounted on a countershaft 36. A second pinion 37 on countershaft 36 drives a gear 39 on driven shaft 31 on which transfer wheel 30 is mounted. Preferably the shaft 31 is mounted to run in a set of precision ball bearings 41, 43. The size and arrangements of the gears will depend on the desired speed of the transfer wheel and the speed of the driving motor.

The bottom portion of housing 29 is preferably of dove-tail shape, and mates guide 26 on the intermediate base with reference to which it is slidable. The slide together with the motor and transfer wheel mounted thereon can be moved by means of operating arm 42.

The dressing device attachment assembly comprises a frame 44 rigidly connected with the intermediate base by means of two knurled locking screws 45, 45' which are screwed into threaded bores in the edge of the intermediate base 11 remote from the diamond wheel to be worked on. The frame 44 contains a horizontal guide 46 for the slidable base 47 in which a bracket 49 is mounted by means of a shaft 50 which is rotatably mounted in a vertical bearing 51 in frame 44. The bracket 49 contains at its upper end a holder for the operating means of the diamond point dressing tool 52. The axis of the diamond dressing tool intersects the axis of the transfer wheel. The slidable base 47 which contains the vertical bearing can be moved towards or away from the transfer wheel by means of the lead screw arrangement, 54, having knurled operating knob 55. A screw clamping member 56 serves for locking the slidable base relative to frame 44 in adjusted position.

In the horizontal holder 48 is mounted a micrometer type of feed device 53 for adjusting the position of the diamond point dressing device.

In the dressing operation of the portable dressing machine, the machine is placed on and clamped to the work table of the diamond lapping machine. The high rotational speed of the diamond lapping wheel 1 is not changed. The reference point of the intermediate base 11 is aligned with the zero of the base graduations 15 and the intermediate base is clamped by the set screw 22. This makes the guided slide 27 of the housing bottom 29 (and also the transfer wheel axis) parallel to the diamond wheel axis. The transfer wheel 30 is now set in motion by starting its electric motor drive. The transfer wheel 30 is now moved toward the diamond wheel by moving slide 27 relative to guide 26 by moving the operating arm 42. When the transfer wheel 30 makes contact with the diamond lapping wheel, the small diamond particles are torn from their matrix along with their surplus matrix, and the diamond lapping wheel is quickly dressed. When sufficient diamond particles have been stripped so that the diamond lapping wheel is considered dressed, the work table 5 and the dressing machine are withdrawn from the diamond lapping wheel. The entire operation is achieved in a very short time.

In the conical shaping operation, the process is somewhat similar, except that housing 29 is turned on base 6 to a selected angle on graduation 15 and locked by set screw 22. The transfer wheel is moved back and forth along its axis while the work table is fed slowly towards the diamond lapping wheel. The dressing operation now takes place along a conical surface.

In the contour operation, the negative of the desired contour is first cut into the periphery of the transfer wheel by the diamond point tool attachment. For example, let the contour be a simple radius. The diamond tool 52 is moved from its axis of pivot by the micrometer feed 53 until the desired radius is indicated. (Note that a concave or convex radius can be placed on the transfer wheel by moving the diamond tool to and beyond the axis of pivot or as in this example, withdrawn from the axis of pivot.) The transfer wheel 30 is now moved along its axis by the operating arm 42 until it is correctly located in relation to the diamond cutting tool axis to receive the convex radius. It is then locked by clamping screw 33. The diamond tool is now moved into the transfer wheel by the lead screw arrangement 54 and the operating knob 55 until the diamond tool point is in contact with the periphery of the transfer wheel. The diamond tool is rotated about its pivot in bearing 51. As the diamond tool contacts the rotating transfer wheel the grinding wheel particles are torn from its matrix forming the convex radius. The diamond tool is now withdrawn. The radius, now formed on the transfer wheel, is transferred to the diamond lapping wheel by first feeding the transfer wheel with its convex radius directly into the diamond lapping wheel where the radius is desired. The diamond particle stripping process and the removal of the superfluous matrix takes place and a concave radius is quickly formed on the diamond lapping wheel. The transfer wheel is now withdrawn from the diamond lapping wheel as before.

Testing has verified that no appreciable wear is experienced with the transfer wheel because of two phenomena. (1) The effective adhesive forces between the tiny smooth surfaces of the diamond particles and its matrix is less than the effective adhesive forces of the coarser tiny surfaces of the grinding wheel particles and its matrix; and (2) the difference in the surface stress levels of the two wheels. The diamond lapping wheel is operated at high speed thus the diamond particles are stressed radially by the high centrifugal forces and circumferentially by the commonly known "hoop" stresses. Both of these stresses add vectorially to produce a high surface particle stress level. The transfer wheel on the other hand is rotating slowly thus its surface particles are stressed negligibly. When both wheels make contact, an additional impulse is transmitted equally to the surface particles of both wheels. This additional impulse stress adds to the already high stress level of the diamond lapping wheel particles so that the total stress exceeds the rupture value between the diamond particles and its matrix thus tearing the particles from the wheel and dressing the diamond lapping wheel. The additional impulse stress imposed on the grinding wheel particles is well within the rupture value and particles are not torn loose from the surface of the grinding wheel (transfer wheel). Thus, rotating the diamond wheel at high speeds and the transfer wheel at low speeds enables the dressing operation to proceed swiftly and yet imposes negligible wear on the slow moving dressing wheel.

Diamond lapping or grinding wheels as now manufactured and sold on the market may be considered as of three classes depending on the bonding material employed, that is, resinoid vitrified and metal bonded wheels. The invention is applicable to all types of diamond wheels.

The particular type of grinding wheel used for the transfer wheel is not critical although the aluminum oxide type has been found very satisfactory.

In operation it has been found that no particular difference in speed is required for dressing different types of diamond wheels and as an example a surface speed of the order of from 4500 to 5000 surface feet per minute with the dressing wheel turning to producing about 1000 ft. per minute or less are satisfactory. The direction of running of the wheels is not of primary importance although there is a slight improvement in cutting when the wheels are run with the surface directions of both wheels in the same direction.

We claim:

1. The method of shaping the periphery of a diamond impregnated lapping wheel comprising turning the wheel on its axis at a peripheral speed of about 4500 to 5000 feet per minute at which speed the peripheral surface material is subjected to centrifugal force, approaching the limit of the bonding material thereof to withstand, applying to the periphery of the diamond wheel a grinding wheel having a negative of the shape it is desired to impart to the diamond wheel, turning the grinding wheel at a peripheral speed considerably less than that of the diamond wheel whereby the bonding strength in the local portions of the periphery of the diamond wheel contacted by the grinding wheel are exceeded and the periphery of the diamond wheel takes the desired shape without materially altering the shape of the grinding wheel.

2. The method of dressing a diamond abrading wheel comprising rotating the diamond impregnated wheel in the machine in which it operates in performing abrading operations at a peripheral speed of about 4500 to 5000 feet per minute which speed is sufficiently high to produce sufficient centrifugal force and hoop effect to approach the limit of the bonding pull of the bonding material of the diamond wheel, contacting the diamond wheel with a grinding wheel operating at a considerably lower surface speed than the diamond wheel so as to pass the bonding pull of the diamond wheel and locally rupture and remove particles of the diamond wheel contacting the slower moving grinding wheel so that the diamond wheel assumes the shape applied thereto by the action of the grinding wheel without materially altering the grinding wheel, the shape applied to the diamond wheel being concentric with the axis of rotation without further dressing or wearing of the diamond wheel.

3. The method of dressing, shaping, or contouring a lapping wheel containing diamonds in its operative surface portion, comprising forming on a grinding wheel the negative of a shape desired to be applied to the lapping wheel, rotating the lapping wheel in its normal position of working at a high peripheral speed of about 4500 to 5000 feet per minute so as to develop high stress in the bonding of the peripheral particles in the lapping wheel, turning the grinding wheel at a peripheral speed of about 1000 feet per minute so that the resulting stress in the bonding will be less than that in the lapping wheel, and contacting the surface of the grinding wheel with the surface of the lapping wheel, thus forming the contour on the lapping wheel in one quick operation.

FRANK W. CLARK.
RALPH T. STOLZE.

References Cited in the file of this patent

UNITED STATES PATENTS

| Number | Name | Date |
| --- | --- | --- |
| 1,075,227 | Sheehan | Oct. 7, 1913 |
| 1,143,337 | Walling | June 15, 1915 |
| 1,350,044 | Stryhal | Aug. 17, 1920 |
| 1,424,765 | Larsson | Aug. 8, 1922 |
| 1,513,757 | Hanson | Nov. 4, 1924 |
| 1,896,533 | Vuilleumier | Feb. 7, 1933 |
| 2,414,182 | Wessman | Jan. 14, 1947 |
| 2,528,621 | Sweetser | Nov. 7, 1950 |